(12) United States Patent
Crowson, II

(10) Patent No.: US 8,061,210 B2
(45) Date of Patent: Nov. 22, 2011

(54) ROBUST LOW PROFILE SHAKER

(76) Inventor: Randolph J. Crowson, II, Santa Barbara, CA (US)

( * ) Notice: Subject to any disclaimer, the term of this patent is extended or adjusted under 35 U.S.C. 154(b) by 0 days.

(21) Appl. No.: 12/590,645

(22) Filed: Nov. 12, 2009

(65) Prior Publication Data

US 2010/0058872 A1    Mar. 11, 2010

Related U.S. Application Data

(63) Continuation of application No. 11/974,337, filed on Oct. 11, 2007, now abandoned, which is a continuation of application No. 11/478,003, filed on Jun. 29, 2006, now abandoned, which is a continuation of application No. 10/673,830, filed on Sep. 29, 2003, now Pat. No. 7,069,787.

(51) Int. Cl.
*G01M 7/04* (2006.01)

(52) U.S. Cl. .................................. 73/668; 297/217.4
(58) Field of Classification Search ............... 73/663, 73/668; 297/217.3, 217.4; 381/333
See application file for complete search history.

(56) References Cited

U.S. PATENT DOCUMENTS

| | | | | |
|---|---|---|---|---|
| 4,697,581 A * | 10/1987 | Endo et al. | ...................... | 601/78 |
| 6,211,775 B1 * | 4/2001 | Lee et al. | ................... | 340/407.1 |
| 6,256,397 B1 * | 7/2001 | Komatsu | ....................... | 381/396 |
| 7,069,787 B2 * | 7/2006 | Crowson, II | ................... | 73/668 |

* cited by examiner

*Primary Examiner* — John Chapman, Jr.

(57) ABSTRACT

An electrodynamic shaker apparatus is disclosed for providing shaking and/or vibrational motion. The shaker includes armature and stator assemblies as well as a distributed spring assembly. The shaker apparatus of the present invention is robust, supports increased off-center loads, and has a low profile such that it may be easily placed under an item of furniture in order to impart vibrational motion in response to electrical signals from a variety of sources.

20 Claims, 8 Drawing Sheets

ROBUST LOW PROFILE SHAKER

RELATED APPLICATION INFORMATION

This application claims the benefit of and is a continuation of U.S. patent application Ser. No. 11/974,337 filed on Oct. 11, 2007 now abandoned, which is a continuation of U.S. application Ser. No. 11/478,003 filed on Jun. 29, 2006, now abandoned, which is a continuation of U.S. application Ser. No. 10/673,830 filed on Sep. 29, 2003, now U.S. Pat. No. 7,069,787, all of which are entitled ROBUST LOW PROFILE SHAKER, and each of which is to incorporated herein by reference in its entirety.

BACKGROUND OF THE INVENTION

1. Field of the Invention

This invention relates generally to an apparatus for converting electrical signals into physical motion through the use of an electromagnetic transducer. In particular, the present invention provides a robust, low profile shaker system having an increased off center load acceptance which may be easily placed under an object in order to impart vibrational motion in response to electrical signals from a signal source.

2. Description of Related Art

The field of electrodynamic transducers for imparting shaking or vibrational motion is well established. The applicant for the present invention considered several prior shaker systems and noted the deficiencies listed below.

Existing electrodynamic shakers are designed to produce a cyclical force on a test subject or platform (typically using a load leveling suspension system) that is independently stable and sufficiently stiff in all directions except the intended direction of motion. The system shown and described in "Understanding The Physics of Electrodynamic Shaker Performance" (*Sound and Vibration*, October 2001 pgs 2-10) by George Fox Lang and Dave Snyder is one such system. Particularly, the moving portion of a voice coil actuated shaker can be damaged by loads in directions other than the direction of intended motion.

U.S. Pat. No. 6,389,900 shows a shaker design wherein the shaker is isolated from all forces on the test subject that are not aligned with the direction of intended motion or offset from the center of the coil. This is typically accomplished by coupling the two sides with a long thin rod called a stinger. The resulting assembly is complex, large and expensive.

Some shakers use a more integrated approach in which two plate style flexures are used to add stiffness in the transverse direction (perpendicular to the direction of intended motion) and support forces which are aligned with the intended direction of motion but offset from the coil center (moments). Examples of such systems can be found in the article "Electrodynamic Shaker Fundamentals" by George Fox Lang (*Sound and Vibration*, April 1997 pgs 1-8) and in the Labworks Inc "Shaker Engineering Info." The two plates must be separated by a large distance to provide adequate moment stiffness. This adds complexity, limits armature displacement and greatly adds to the height of the system.

Still other shakers use a combination of a plate style flexure (which has little moment stiffness alone) above the actuator and a linear bearing on the opposite side, such as the shaker shown in Labworks ET-132-2 product description. The flexure and linear bearing must be separated by a large distance along the intended direction of motion to support large moments. This system however also has limited armature displacement, and adds to the overall height of the assembly.

Shakers also typically use flexible conductors to transmit energy from the actuator body or housing to the moving armature. These flexible conductors are prone to failure due to fatigue.

Thus, prior art shakers using a plate or leaf style armature spring to provide large transverse stiffness with a soft suspension stiffness (i.e. stiffness in the direction of intended armature motion) suffer by not achieving a large maximum load to suspension stiffness ratio (the smaller the suspension stiffness the larger the shaker efficiency) while maintaining a small shaker volume and support large moments. There is therefore a need for providing a robust and efficient shaker which can be flexibly, easily, and inconspicuously installed.

SUMMARY OF THE INVENTION

The current invention encompasses an electrodynamic transducer apparatus (using a typical voice coil) having a moveable armature integrated with a stabilized base platform (stator) to produce a simple, inexpensive, thin, and generally small device that is able to withstand large loads and moments in any direction without damage. The apparatus also maintains high efficiency when operated to shake or vibrate an object, makes use of reliable flex free electrical paths, and may be inconspicuously installed beneath a subject, such as a chair, couch, seat, recliner, platform or other similar object.

There is presented by this invention a shaker apparatus having a moveable armature, a magnet and ferromagnetic material stator assembly, as well as a distributed spring configuration operative between the armature and stator which reduces complexity and axial height and provides increased moment stiffness (off center load support).

In one aspect of the present invention, elastomer load bearing and armature positioning springs are located on the periphery of, and integrated with the voice coil magnetic stator structure, rather than being situated separately above and/or below. The springs provide increased support on the outer edges of the armature or top mounting plate allowing the shaker to withstand large moments without damage. Cylindrical springs are used with rigidly mounted internal pins to increase the stiffness in all directions perpendicular to the axis of the coil (transverse directions). By situating the springs, magnet, and voice coil such that at least a part of each is located in a plane perpendicular to the direction of armature motion, the overall height (profile) of the shaker can be kept to a minimum, making it ideal for placing under objects for imparting vibrational motion.

In another aspect of the present invention, the voice coil is wound on a robust bobbin, which can support large armature transverse loads without damage. Close positioning of the voice coil to the armature top plate or mounting plate makes the assembly insensitive to moment induced tilting.

In yet another aspect of the present invention, the air gap between the iron core outer diameter (OD) and coil bobbin inner diameter (ID) is substantially less (on the order of one-half) than the air gap between the coil OD and outer pole ID. This avoids contact between the vulnerable coil and the outer ring of the stator in the event of a large transverse load.

In still another aspect, material with a low coefficient of friction and high wear resistance (bushing) is used between the coil bobbin and iron core. This material can be adhesively bonded to the iron core, the bobbin or both, and is configured to allow repeated contact with minimal damage.

In another aspect of the present invention, the power connector or power leads exit the assembly from the moving portion (armature) which contains the voice coil. This avoids the conventional flexible connection between the coil and the frame or stationary portion of prior art shakers.

In one alternative embodiment of the present invention, multiple opposing coil-magnet pairs are operatively configured on the armature and stator respectively in a non-voice coil arrangement to produce a force which increases or decreases the distance between the armature and stator. Similar to the first embodiment, elastomer load bearing and coil positioning springs are located on the periphery of, and integrated with the magnetic stator structure, rather than being situated separately above and/or below. The spring(s) provide increased support on the outer edges of the armature or top mounting plate allowing the shaker to withstand large moments. Cylindrical springs are used with rigidly mounted internal pins to increase the stiffness in all directions perpendicular to the axis of the coil (transverse directions).

In another alternative embodiment of the present invention, a plurality of springs, or a uniformity of material with spring-like characteristics (i.e. foam spring, Polyurethane, silicone, etc) is interspersed throughout the shaker body in areas not occupied by opposing coil-magnet pairs.

BRIEF DESCRIPTION OF THE DRAWINGS

For a fuller understanding of the nature and advantages of the present invention, as well as the preferred mode of use, reference should be made to the following detailed description read in conjunction with the accompanying drawings. In the following drawings, like reference numerals designate like or similar parts throughout the drawings.

DETAILED DESCRIPTION OF THE PREFERRED EMBODIMENT

The present description is of the best presently contemplated mode of carrying out the invention. This description is made for the purpose of illustrating the general principles of the invention and should not be taken in a limiting sense.

All publications referenced herein are fully incorporated by reference as if fully set forth herein.

The present invention can find utility in a variety of implementations without departing from the scope and spirit of the invention, as will be apparent from an understanding of the principles that underlie the invention. For instance, the present invention is best described as used in conjunction with items of furniture and entertainment systems (including home audio/video equipment, theater or other large public venue equipment, demonstration, simulation, or game systems, etc) such that the shaker can vibrate the home furnishings in response to electrical signals from the entertainment system, however it may find utility when used with a plethora of systems or devices which are to be shaken or vibrated, such as laboratory test subjects, dance floors, platforms etc.

Figure 1:
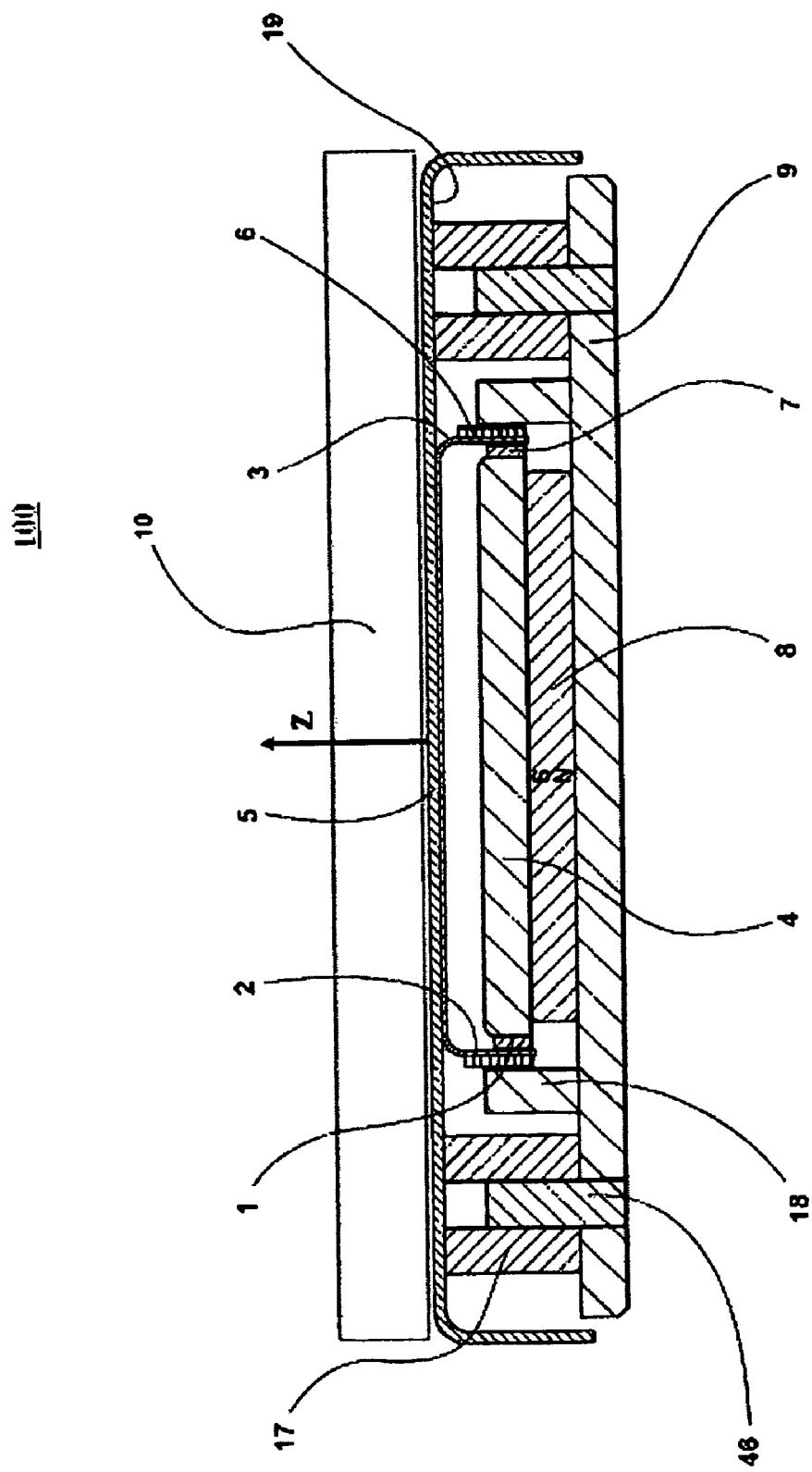
FIG. 1 is a side cutaway view of the present invention.
Figure 2:
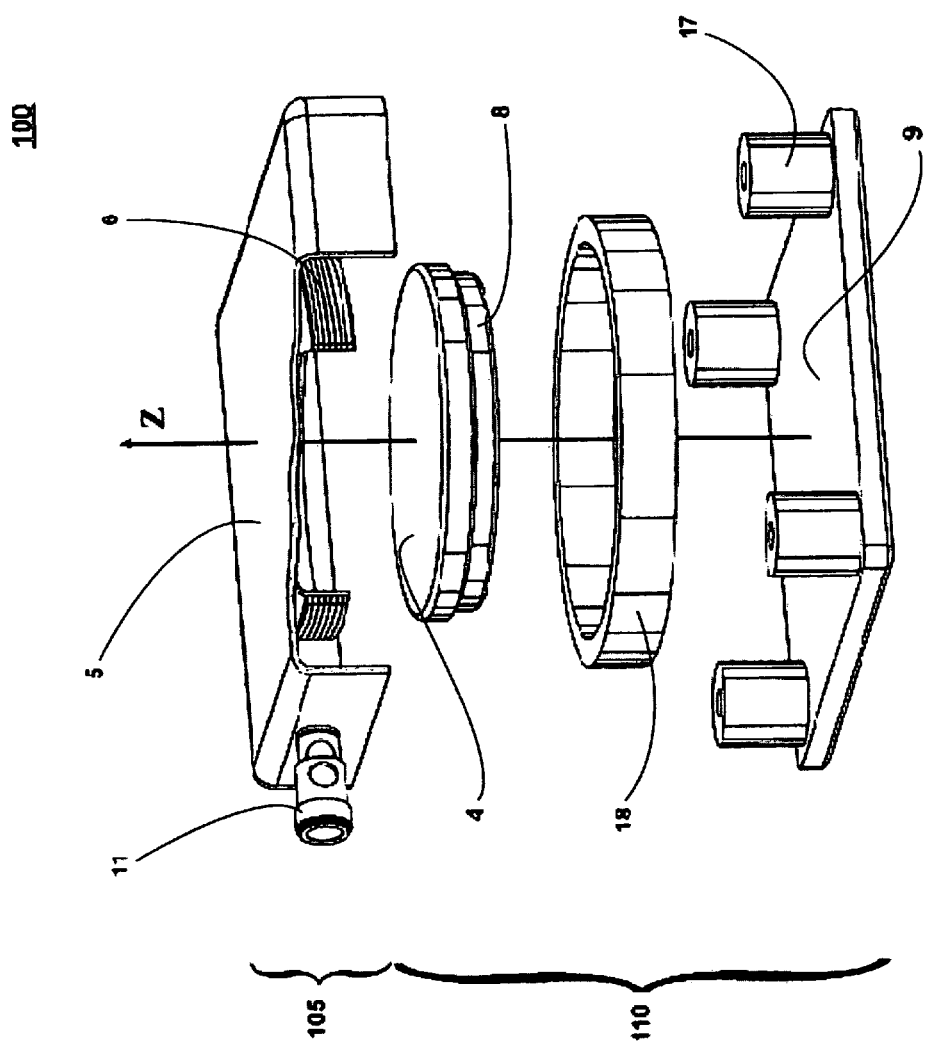
FIG. 2 is an exploded view of the present invention shown in FIG. 1.

Looking now to FIGS. 1 and 2, example shaker apparatus 100 is shown schematically to illustrate the current invention. Generally, shaker 100 comprises a moveable armature portion 105 operatively mounted to a base stator assembly 110 to accomplish vibrational movement. The armature assembly 105 of exemplary shaker apparatus 100 comprises a top plate 5, coil bobbin 3, and voice coil 6. Voice coil 6 is wound about and adhesively joined to the side portion of the coil bobbin 3. It will also be understood and appreciated that bobbin 3 and voice coil 6 can be integrated as a singular piece according to the current invention. To induce movement of the armature relative to the stator, electrical signals (eg. from an amplifier or other electronic signal generation apparatus) may be transferred to the voice coil 6 via integrated electrical connector(s) 11 fixedly mounted to the armature. The armature assembly is preferably assembled with rivets but may be assembled using adhesive, tack welding, fasteners, or other joining means or combination of joining means. It will be understood and appreciated that many different configurations of the armature, voice coil, and integrated electrical connectors are possible without departing from the spirit and scope of the present invention.

The stator assembly 110 of exemplary shaker apparatus 100 comprises a integrated base plate-bottom pole 9, outer pole 18, magnet 8, and top pole 4. Integrated base plate-bottom pole 9 is made of steel or other material with high magnetic permeability (generally known as ferromagnetic materials). Integrated base plate-bottom pole 9 may be a combination of a rigid support material (base plate) including, but not limited to metals, polymers, plastics, glass or fiberglass materials, ceramic materials, and a smaller ferromagnetic bottom pole. Outer pole 18 (a ring in one embodiment of the present invention) and top pole 4 are made of steel or other ferromagnetic material. Magnet 8 can be a singular piece or multiple pieces of any magnetic material. The stator assembly is preferably assembled with adhesive but can be assembled using welding fasteners or other joining means. Many of the stator components, including integrated base plate-bottom pole 9 and outer pole 18, may be manufactured as a singular structure. It will be appreciated that the integrated base plate-bottom pole 9, outer pole 18, and top pole 4 may be made of the same material, and integrated with the magnet 8. Generally, the bottom pole 9, outer pole 18, and top pole 4 are shaped and fashioned such that magnet 8 and coil 6 may be closely positioned and the magnetic field of magnet 8 focused substantially through coil 6 to maximize vibrating force of the shaker.

Bushing material 7 is fixedly or adhesively attached to top pole 4 in order to support excessive transverse forces between the armature and the stator assembly (due to transverse forces exerted on the top plate 5). Bushing 7 is generally a low coefficient of friction/wear resistant material (such as teflon in the example system) and is used between the ID 2 of coil bobbin 3 and the OD 1 of the top pole 4.

Figure 8:
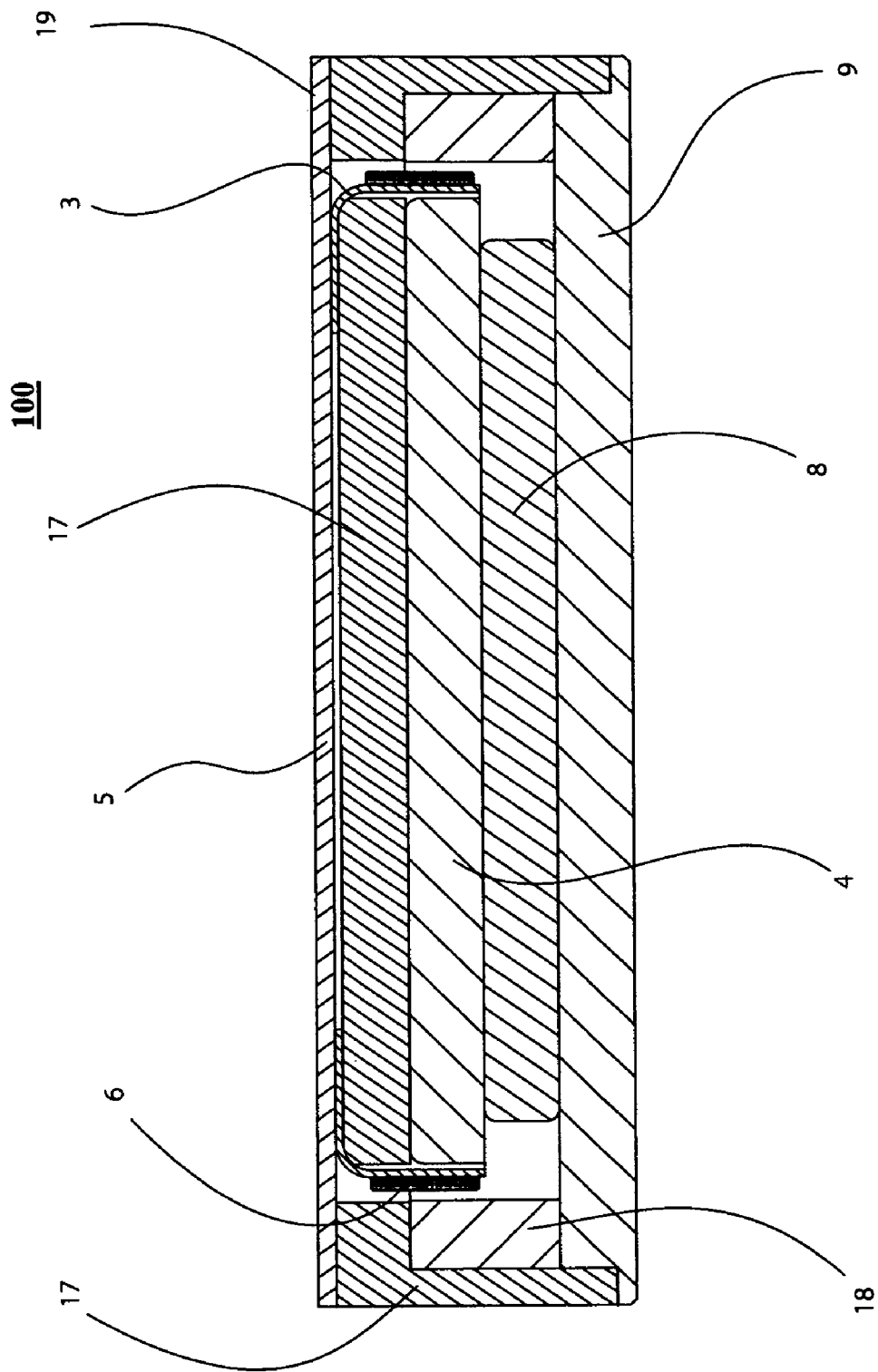
FIG. 8 is a side cutaway view of an embodiment of the present invention showing interspersed springlike material.

Elastomer load bearing and armature positioning springs 17 are located on the periphery of, and integrated with the stator and/or armature structure, rather than being situated separately above and/or below the moveable assembly. This peripheral spring configuration provides increased support on the outer edges of the top plate of the armature allowing the shaker to withstand large moments without damage. Cylindrical springs are used in the current example system with rigidly mounted internal pins 46 to increase the stiffness in all directions perpendicular to the axis of the coil (transverse directions). As such, the shaker of the current invention can be implemented easily in a home entertainment setting without requiring that the legs of furniture or other object be placed directly on the center of the top plate. Looking now to FIG. 2, the armature assembly is supported by one or more springs 17 (four are used in the current example system, one substantially in each corner of the shaker assembly) which are fixedly attached to the underside 19 of the top plate 5 and the top of the bottom plate 9. The springs 17 are preferably made to be stiff in the transverse direction and soft in the direction of vibration by pins 46 rigidly mounted to or integrated with bottom plate 9. The pins 46 may be pressed into holes in the bottom plate 9, fastened with screws, welded in place, or simply fabricated with plate 9 to be a singular base structure during manufacture. The pins 46 extend a distance within the springs equal to the spring height, minus the maximum armature displacement (typically 0.25 inches for a shaker assembly fabricated to support 200 pounds). These pins are optional because the coil bobbin bushing 7 can carry the transverse loads, however added stability and less bushing wear can be achieved by including pins 46. It will be understood and appreciated that spring(s) 17 may be fixedly attached (i.e. adhesively bonded or mechanically fastened) to either or both of the top and bottom plates of the shaker, or may be assembled in a modular/removable fashion (for easy serviceability, shipping, etc of the shaker) such that the weight and pressure of an object placed on the shaker is relied on to keep the shaker assembly together during operation. It will also be appreciated that the pins 46, integrated base plate-bottom pole 9, and outer pole 18 may be machined or cast as a singular member, or may be assembled in a modular nature as described herein. It will also be understood by those skilled in the art that the elastomer cylindrical springs can be replaced with metal coil springs, wave springs, conical washer springs or the like, without departing from the spirit or scope of the present invention. Additionally, the springs 17 may be replaced by a plurality of springs, or as shown in FIG. 8, a uniformity of material with springlike characteristics (i.e. foam spring, Polyurethane, silicone, etc) interspersed throughout the shaker body in areas not occupied by opposing coil-magnet pairs. Other steel-magnet designs may be used such as a conventional ring magnet structure with magnet material located on the outside of the voice coil, a ferromagnetic inner pole, smaller coil diameter and a corresponding ring shaped top pole on the outside of the coil and above the magnet. It will be understood that the spring assembly may comprise one or more springs or springlike materials and generally operates to position the armature relative to the stator, and to flexibly support the armature (especially about the periphery of the shaker top plate) in the presence of a load, even if such load is positioned off the center of the top plate.

The armature assembly 105 is positioned such that the voice coil 6 is suspended within the air gap of the DC field generated by the integrated base plate-bottom pole 9, magnet 8, top pole 4, and outer pole 18 assembly. The armature assembly is designed to vibrate or move in the direction of the voice coil 6 axis (the "z" axis) relative to the steel-magnet assembly, when AC electrical current is passed through the voice coil 6. As will be appreciated by those skilled in the art, the presence of AC current in voice coil 6 generates vibratory force and motion along the Z-axis in shaker 100. Given that the AC current for the shaker will becoming from audio/video equipment according to one contemplated implementation of the present invention, an amplifier will be necessary in most cases to generate sufficient force to vibrate a large and/or heavy object. For instance, 50 watts RMS power may be required for a shaker that is 5 inches long, 5 inches wide and 1 inch tall to vibrate a 100 lb mass with a reasonable amplitude. In an alternate embodiment of the present invention, an appropriate amplification and power conditioning system may be integrated with the shaker apparatus 100, either externally, internally, or a combination of both in order to present a desired amount of current to drive the shaking motion of the apparatus.

Alternative implementations of the coil portion may involve traces in a printed circuit board or surface mounted on or inside (embedded) the armature plate in order to affect vibratory motion in the shaker. Additionally, the coil portion may be wound without the aid of a rigid bobbin structure, simply being held by adhesives, bonding agents, or the like in order to maintain a desired shape and affixed to the top plate. All that is required is that coil portion 6 be configured such that a vibratory force is produced in the presence of magnet 8 when AC current is passed through coil portion 6.

The shaker assembly is intended to be placed on a stiff surface while the subject 10 (such as an object or item of furniture) is placed on or attached to the top of the top plate 5. The size and shape of various components and portions of the armature and stator assemblies can vary widely depending on the desired application, and the desired amount of vibrational force intended to be generated by the shaker assembly. By way of example and not limitation, the integrated base plate-bottom pole 9, and top plate 5 are configured in a substantially square shape in the exemplary system shown in FIGS. 1 and 2, with the coil bobbin 3, outer pole 18, magnet 8, and top pole 4 being configured in substantially circular or cylindrical shapes in order to improve the uniformity of the DC field within the gap and simplify the manufacturing processes. It will be understood and appreciated that many different shapes, sizes, and implementations of the current invention are possible without departing from the spirit and scope of the current invention.

Figure 3:
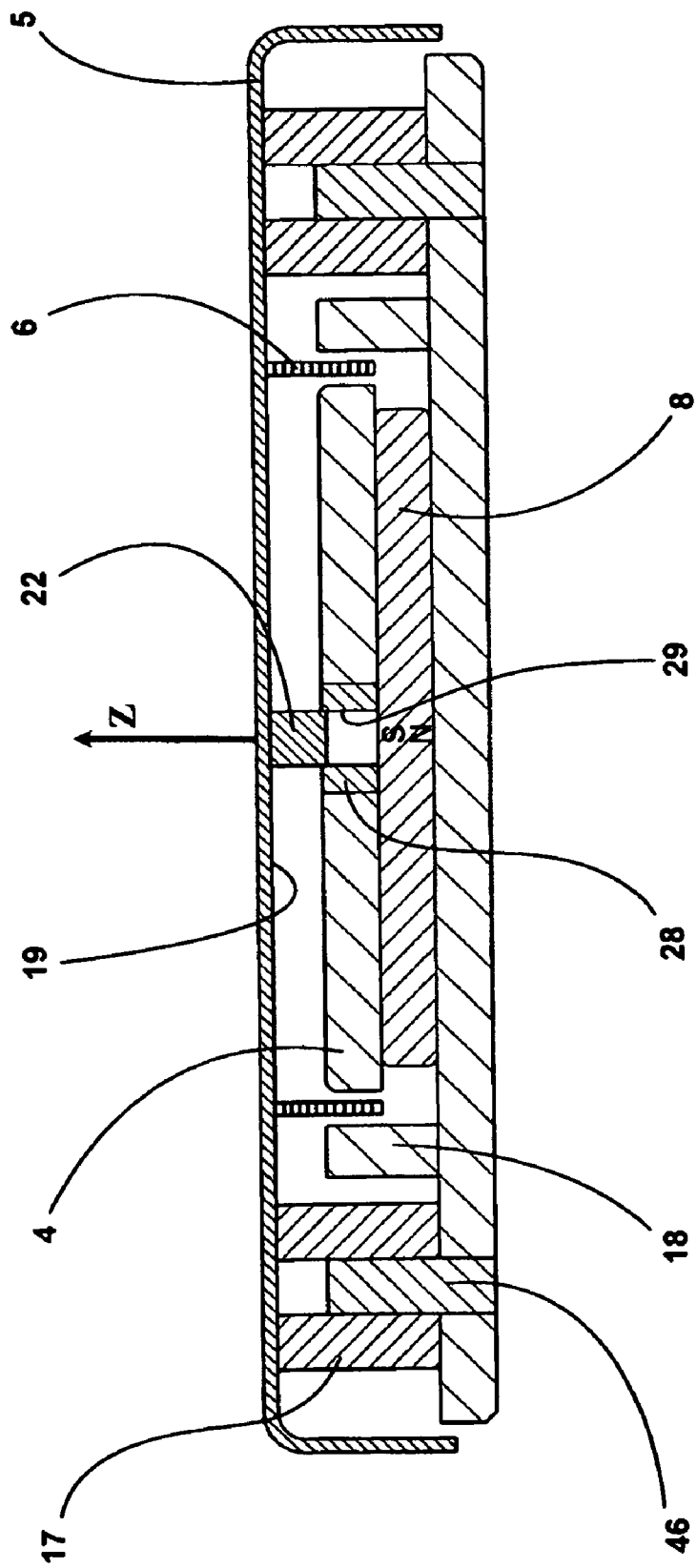
FIG. 3 is a side cutaway view of another embodiment of the present invention.
Figure 4:
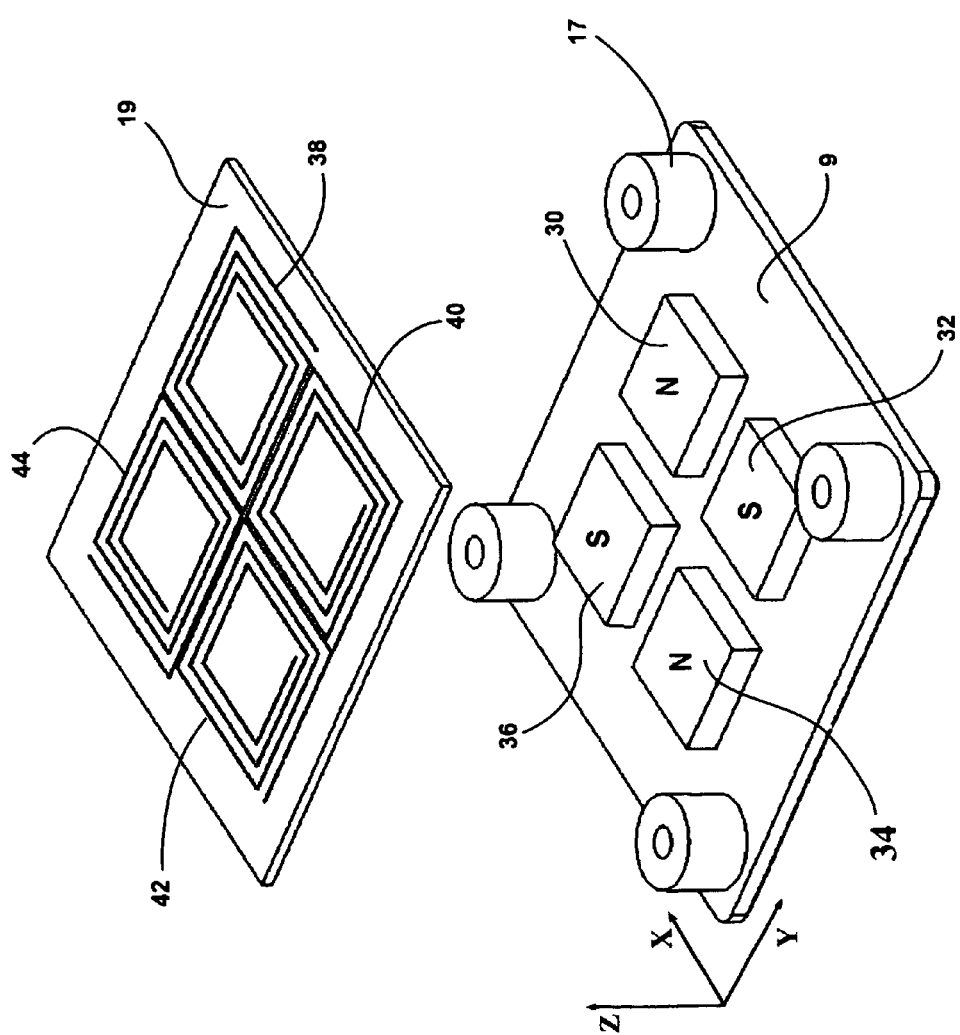
FIG. 4 is an exploded view of another embodiment of the present invention.
Figure 5:
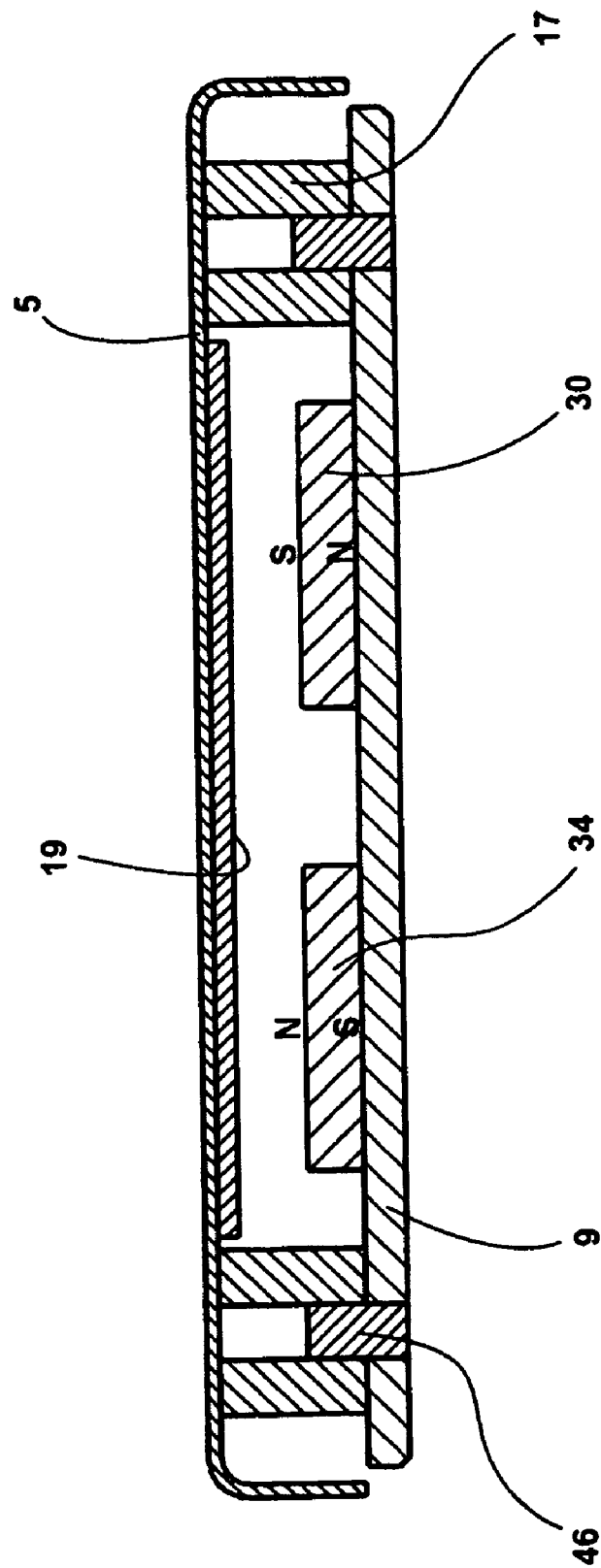
FIG. 5 is a side cutaway view of the embodiment of the present invention shown in FIG. 4.
Figure 6:
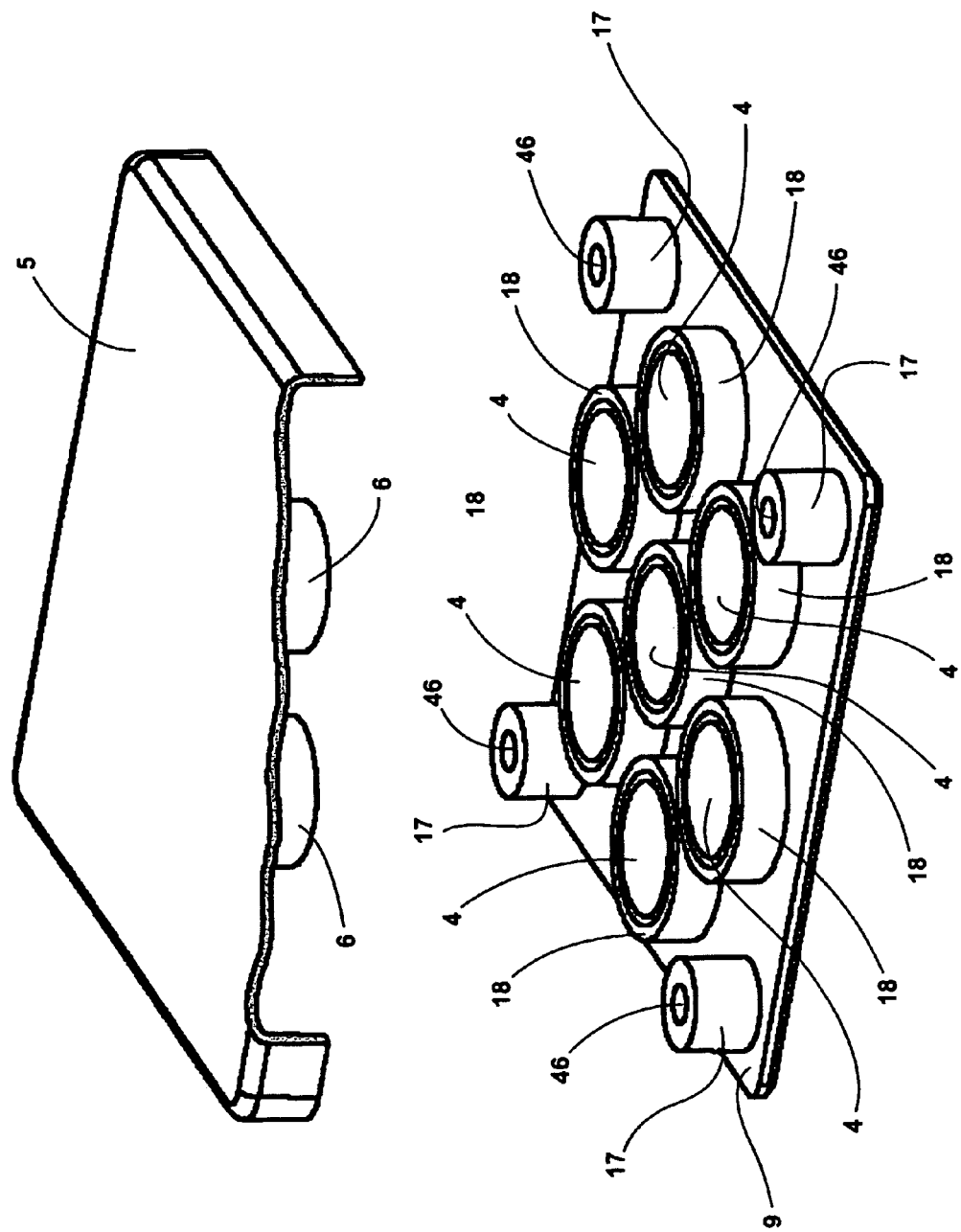
FIG. 6 is an exploded view of another embodiment of the present invention showing multiple coil-magnet pairs.
Figure 7:
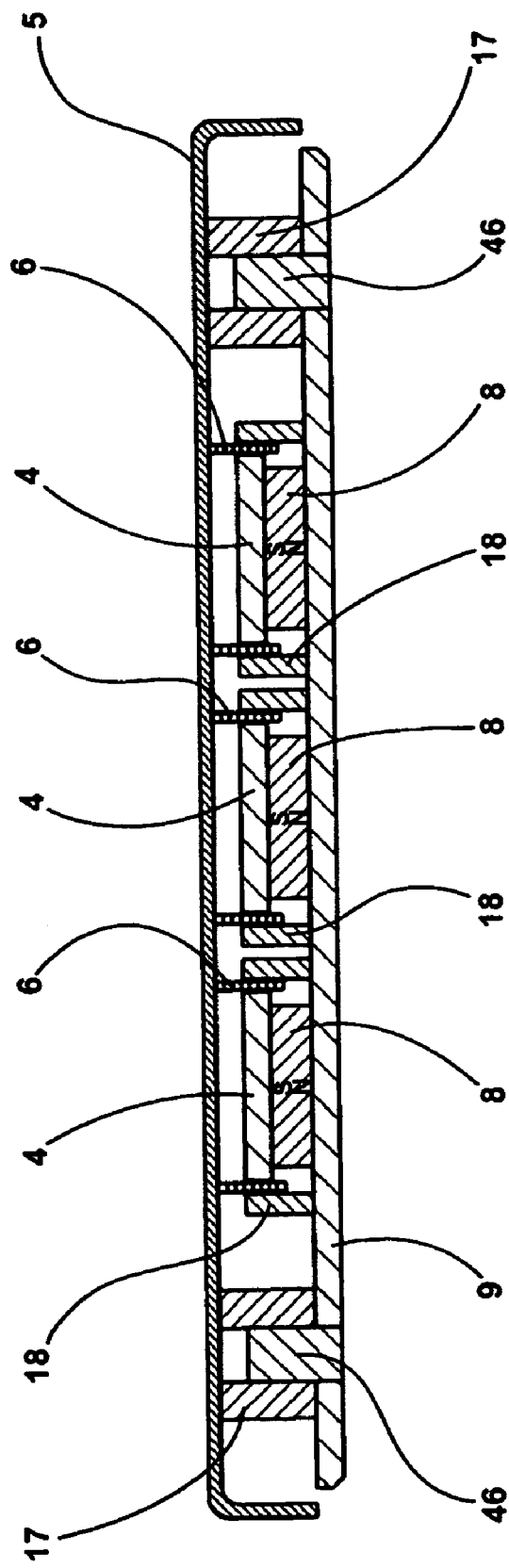
FIG. 7 is a side cutaway view of the embodiment of the present invention shown in FIG. 6.

In an alternate embodiment shown in FIG. 3, a boss 22 in the center of the voice coil 6 is firmly attached to the top plate 5 and fitted to a bushing 28, 29 mounted in the center of the top pole 4. The boss 22 provides the excessive transverse load carrying capacity in this embodiment, and thus bushing material 7 on top pole 4 and robust coil bobbin 3 are not needed. Without the coil bobbin 3 the voice coil 6 can be fabricated as a free standing coil and adhesively joined to the underside 19 of the top plate 5. It will be appreciated that many different configurations of bushings, bosses, rails, grooves or other similar guides for carrying transverse loads between the armature and stator, and generally fixing the vibrational motion of the shaker to substantially one axis are possible without departing from the spirit and scope of the current invention.

In another alternative embodiment of the present invention shown generally in FIGS. 4 through 7, multiple opposing coil-magnet arrays are operatively configured on the armature and stator respectively in either voice coil or non-voice coil arrangements such that uniform activation of the coil sections with AC current produce a vibrational motion in the armature. In order to generate a uniform magnetic field for the coil sections 38, 40, 42 and 44 on underside 19 of top plate 5 (which is mounted to or integrated with top plate 5) to interact with, a uniform size, shape, and gap (placement) is chosen for magnets 30, 32, 34, and 36 of the magnet array. Depending on design choices, and the desired size and/or vibrational force of the shaker, many different coil-magnet array combinations are possible given the present design, such as those shown in FIGS. 6 and 7. It will generally be desirable to select a design which maximizes the "X" and "Y" oriented field strength felt by each coil section as this will produce the greatest amount of force in the presence of AC current. Coils may be activated by internal or external circuitry (not shown), and uniformly actuated in order to induce vibrational motion in the armature. Various bushing, pin, rail, or other mounting mechanisms are used to position and stabilize the armature of the present embodiment with respect to the stator, as described above. As with the exemplary embodiment above, elastomer load bearing and coil positioning springs are located on the periphery of, and integrated with the magnetic stator structure. The springs provide increased support on the outer edges of the armature or top mounting plate allowing the shaker to withstand large moments without excessive armature tilting. Cylindrical springs are used with rigidly mounted internal pins to increase the stiffness in all directions perpendicular to the axis of the coil (transverse directions).

It will be appreciated that in addition to the various coil and magnet shapes, sizes, and configurations (collectively the electromagnetic assembly), and spring assembly arrangements discussed in various embodiments above, many different ways of mounting or integrating the electromagnetic and spring assemblies with the armature top plate and stator bottom plate are possible in order to fashion a robust, low profile shaker assembly in keeping with the spirit and scope of the present invention. Additionally, while the overall shaker housing (as shown and described) comprises top and bottom plates having a substantially square shape, it will be understood that many different shaker housing shapes, sizes, and configurations are possible in keeping with the spirit and scope of the current invention. For instance, circular, triangular, rectangular, hexagonal, octagonal, as well as many other shaker housing (i.e. the top and bottom plates which form the armature and stator portions respectively) shapes and structures may be implemented in conjunction with the current invention.

Many additional forms and implementations of the low profile shaker apparatus of the present invention could be contemplated for a variety of purposes without departing from the scope and spirit of the current invention.

The system and process of the present invention has been described above in terms of functional aspects in schematic diagram format. It is understood that unless otherwise stated to the contrary herein, one or more functions and aspects of the apparatus may be integrated in a single physical device, or one or more functions may be implemented in separate physical devices, without departing from the scope and spirit of the present invention.

It is appreciated that detailed discussion of the actual implementation of each apparatus module is not necessary for an enabling understanding of the invention. The actual implementation is well within the routine skill of a mechanical and system engineer, given the disclosure herein of the system attributes, functionality, and inter-relationship of the various functional modules in the system. A person skilled in the art, applying ordinary skill can practice the present invention without undue experimentation.

While the invention has been described with respect to the described embodiments in accordance therewith, it will be apparent to those skilled in the art that various modifications and improvements may be made without departing from the scope and spirit of the invention. Accordingly, it is to be understood that the invention is not to be limited by the specific illustrated embodiments.

What is claimed is:

1. A moveable assembly for imparting motion to an object of furniture in response to electrical signals from audio/video equipment, comprising:
    a bottom portion;
    a moveable top portion opposing the bottom portion;
    an electromagnetic assembly, a portion of the electromagnetic assembly being integrated with the top portion and another portion of the electromagnetic assembly being integrated with the bottom portion in order to produce motion corresponding to a combination of frequencies in at least the top portion in synchronization with the electrical signals from the audio/video equipment; and
    a spring assembly capable of supporting the load from the object of furniture by providing resilient support between the bottom portion and the top portion, wherein the spring assembly comprises at least three discrete springs located at the periphery of the electromagnetic assembly such that at least part of each spring is co-planar with at least part of the electromagnetic assembly, and wherein the height of the spring assembly is substantially equal to the maximum distance between the bottom portion and the top portion.

2. A moveable assembly as in claim 1, wherein the electromagnetic assembly comprises at least one coil portion and at least one magnetic portion.

3. A moveable assembly as in claim 2, wherein the coil portion comprises at least one of the following: a wound voice coil operatively attached to the top portion, a coil configured on the surface of the top portion, and a coil embedded in the top portion.

4. A moveable assembly as in claim 2, wherein the magnetic portion comprises:
    a permanent magnet for interacting with the coil portion in order to produce the motion corresponding to a combination of frequencies; and
    at least one metallic pole piece for interacting with the magnetic field of the permanent magnet.

5. A moveable assembly as in claim 4, wherein the metallic pole piece comprises:
    a bottom pole operatively connected to the bottom portion; and
    a top pole configured at least partially above, and fixably coupled to the permanent magnet, all poles being operative together to focus the magnetic field of the permanent magnet substantially through the coil portion and perpendicular to the direction of motion.

6. A moveable assembly as in claim 5, wherein the permanent magnet is configured as least partially above, and fixably coupled to, the bottom pole.

7. A moveable assembly as in claim 4, wherein the magnetic portion is configured entirely on the bottom portion, and includes all ferromagnetic materials in the moveable assembly.

8. A moveable assembly as in claim 1 wherein the top portion comprises a substantially planar rigid top plate for contacting at least a portion of the object of furniture such that the motion corresponding to a combination of frequencies may be imparted to the object of furniture in the presence of the electrical signals, and wherein the bottom portion comprises:
    a substantially planar rigid base plate having a first side for supporting at least a portion of the spring assembly and at least a portion of the electromagnetic assembly; and
    a second side for contacting at least a portion of a fixed surface.

9. A moveable assembly for imparting variable motion to an object of furniture, comprising:
    a bottom portion;
    a moveable top portion opposing the bottom portion;
    an electromagnetic assembly, a portion of the electromagnetic assembly being integrated with the top portion and another portion of the electromagnetic assembly being integrated with the bottom portion in order to produce variable motion in at least the top portion;

a spring assembly capable of supporting the load from the object of furniture by providing resilient support between the bottom portion and the top portion, wherein the spring assembly comprises a uniformity of spring-like material within the moveable assembly that compresses to support the weight of the object and functions to align the top portion with the bottom portion during said compression.

10. A moveable assembly as in claim 9, wherein the spring assembly is adhesively attached to the bottom portion and the top portion, and the height of at least a portion of the spring assembly is substantially equal to the largest distance between the bottom portion and the top portion.

11. A moveable assembly as in claim 9, wherein the spring assembly aligns the top portion with the bottom portion of the electromagnetic assembly in a substantially parallel fashion during said compression.

12. A moveable assembly as in claim 9, wherein the electromagnetic assembly comprises at least one coil portion and at least one magnetic portion.

13. A moveable assembly as in claim 12, wherein the coil portion comprises at least one of the following: a wound voice coil operatively attached to the top portion, a coil configured on the surface of the top portion, and a coil embedded in the top portion.

14. A moveable assembly as in claim 12, wherein the magnetic portion comprises:
    a permanent magnet for interacting with the coil portion in order to produce the motion; and
    at least one metallic pole piece for interacting with the magnetic field of the permanent magnet.

15. A moveable assembly as in claim 14, wherein the metallic pole piece comprises:
    a bottom pole operatively connected to the bottom portion; and
    a top pole configured at least partially above, and fixably coupled to the permanent magnet, all poles being operative together to focus the magnetic field of the permanent magnet substantially through the coil portion and perpendicular to the direction of variable motion.

16. A moveable assembly as in claim 15, wherein the permanent magnet is configured as least partially above, and fixably coupled to the bottom pole.

17. A moveable assembly shaped and suited for use between a fixed surface and moveable object, comprising:
    a bottom portion, the bottom portion comprising a rigid surface for contacting the fixed surface;
    a top portion opposing the bottom portion, the top portion comprising a substantially planar rigid surface for receiving at least a portion of the moveable object;
    a spring assembly for providing resilient support between the bottom portion and the top portion, the spring assembly comprising a plurality of discrete spring elements for supporting the top portion; and
    an electromagnetic assembly, the electromagnetic assembly comprising a plurality of opposing coil-magnet pairs being operatively integrated with the top portion and with the bottom portion in order to produce variable motion substantially along a single axis in at least the top portion.

18. A moveable assembly as in claim 17, wherein the moveable object comprises at least a portion of a unit of furniture, and the spring assembly is configured to support the load on the top portion created by the at least a portion of the unit of furniture.

19. A moveable assembly as in claim 17, wherein the assembly comprises at least three discrete springs located at the periphery of the electromagnetic assembly such that at least a part of each spring is co-planar with at least a part of the electromagnetic assembly.

20. A moveable assembly as in claim 17, wherein the height of the spring assembly is substantially equal to the maximum distance between the bottom portion and the top portion.

* * * * *